Sept. 10, 1963   J. J. JONAS   3,103,592
MAGNETIC ROTATING APPARATUS
Filed Dec. 21, 1959   3 Sheets-Sheet 1

John Joseph Jonas
INVENTOR

BY Burns, Doane, Benedict & Irons
ATTORNEY

Sept. 10, 1963        J. J. JONAS        3,103,592

MAGNETIC ROTATING APPARATUS

Filed Dec. 21, 1959        3 Sheets-Sheet 2

John Joseph Jonas
INVENTOR

BY Burns, Doane, Benedict & Swecker
ATTORNEY

Sept. 10, 1963 J. J. JONAS 3,103,592
MAGNETIC ROTATING APPARATUS
Filed Dec. 21, 1959 3 Sheets-Sheet 3

John Joseph Jonas
INVENTOR

BY Burns, Doane, Benedict & Irons
ATTORNEY

United States Patent Office 3,103,592
Patented Sept. 10, 1963

3,103,592
MAGNETIC ROTATING APPARATUS
John Joseph Jonas, Cambridge, England, assignor to Ransome & Marles Bearing Company Limited, Newark on Trent, England, a company of Great Britain
Filed Dec. 21, 1959, Ser. No. 860,989
Claims priority, application Great Britain Jan. 30, 1959
14 Claims. (Cl. 250—224)

This invention relates to the rotation of generally spherical objects.

According to the invention there is provided apparatus for the rotation of objects of generaly spherical form comprising support means for magnetically supporting the object, control means responsive to the vertical position of the object and acting to control the said magnetically supporting means so as to maintain the object in a predetermined position, means for rotating the object about a first axis, means for rotating the object also about a second axis, and means for regulating the rotation of the object about the first axis and the second axis so that the rotation of the object about the second axis is of a predetermined nature.

The invention is particularly (though not exclusively) applicable to the surface inspection of balls for ball bearings so that imperfections in the surface of the ball likely to interfere with the efficiency of operation can be readily detected and the invention will be described in relation to this application.

In this application of the invention scanning means is provided to give an indication of the surface condition of the ball.

Ball bearings, especially of the type known as precision ball bearings, are often required to operate for long periods under arduous conditions and with great dependability.

The ability of ball bearings to meet these requirements is influenced by several factors one of which is the condition of the surface of the ball. The indication of this condition can be used in an inspection process for the selection of balls suitable for meeting the aforesaid requirements. Defects in surface conditions can take the form of surface cracks, grinding marks, imperfect polishing, out-of-roundness, slag inclusions and the like.

Two embodiments of the invention particularly useful for inspecting the surface of balls will now be described by way of an example in conjunction with the accompanying drawings in which.

Figure 1:
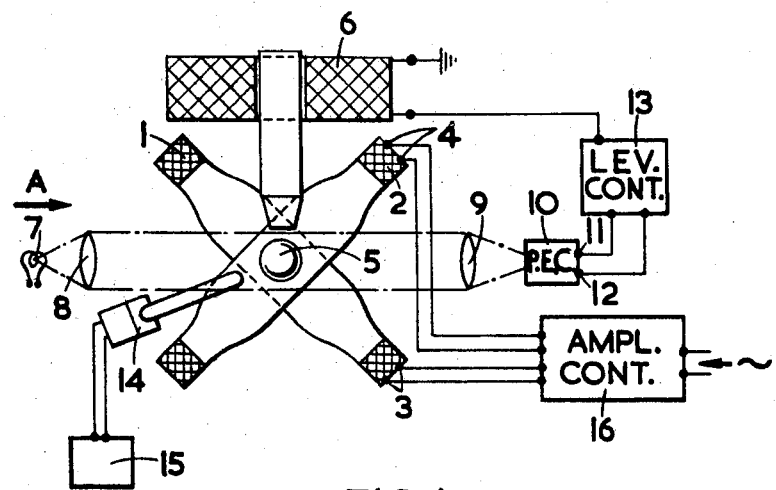
FIGURE 1 is a diagrammatic drawing of one embodiment in the form of a cross-section on the line I—I of FIGURE 2.

When a ball, of magnetic and electrically conducting material is supported for example magnetically at the centre of two coils intersecting each other at right angles, and if an alternating current is fed to the two coils such that the two coils are fed in quadrature, i.e. the current in one coil is 90° out of phase with the current in the other coil, then the ball will rotate about an axis substantially parallel to the axis joining the intersections of the coils. The out-of-phase currents fed to the coils produce a rotating magnetic field which acts upon the ball causing it to rotate. This action can be likened, for example, to the action of an induction motor, in which a rotataing magnetic field acts upon a rotor to cause rotation thereof. The speed of rotation of the ball under the action of the rotating magnetic field, described above, will depend mainly upon the frequency and magnitude of the alternating current fed to the coils but will be affected by hysteresis, material of the ball, relative strengths of the various magnetic fields, etc.

If the two coils causing rotation of the ball and the support magnet are very accurately mounted so that the plane of the rotating magnetic field is exactly coincidental with the axis of the magnetic field of the support magnet, this axis being exactly vertical, then the rotational axis of the ball is not affected by the supporting field. If, however, the axis of intersection of the two coils is inclined slightly relative to a plane normal to the axis of the support magnet so that the plane of the rotating field is at an angle to the axis of the support magnet, then the supporting field will have an effect on the rotational axis of the ball. The effect of the supporting field is to cause the axis of rotation to take up an angular position which is at some intermediate position between the axis of the rotating field and the axis of the support magnet. The actual angular position will depend upon the relative strengths of the rotating field and the supporting field. The stronger the rotating field relative to the supporting field the closer will the rotational axis of the ball approach the axis of the rotating field. Conversely, the stronger the supporting field relative to the rotating field the closer will the rotational axis of the ball approach the axis of the supporting field. It will thus be seen that by varying the strength of the rotating field from a maximum to zero the rotational axis of the ball can be caused to precess from for example a nearly horizontal position to a vertical position. By transposing the electrical connections to one of the coils causing rotation of the ball and then increasing the strength of the rotating field from zero to a maximum the axis of rotation can then be caused to continue precessing to a nearly horizontal position spaced approximately 180° from its original position.

Apparatus for obtaining precession of the rotational axis of the ball using two coils, as explained above, is illustrated diagrammatically in FIGURE 1. Two ring shaped coils 1 and 2 intersect each other at right angles, the axis of intersection $x$—$x$ being at an angle $\theta$ to the horizontal. An alternating current is fed to each coil via terminals 3 and 4 respectively, the current fed to one coil being 90° out of phase with the current fed to the other coil but of the same frequency. A ball 5 is supported in the centre of the coils by an electromagnet 6, the axis of which is vertical. The vertical position of the ball is maintained substantialy constant as follows. A beam of light is projected through the coils from a light source 7 by an optical system 8. The light beam, the centre of which is obscured by the ball 5 is focused by an optical system 9 on to a photo-electric cell 10. The photo-electric cell has two cathodes, one being responsive to that part of the light beam passing round and over the top half of the ball and generating a signal which appears at terminal 11. The other cathode is responsive to that part of the light beam passing round and under the bottom half of the ball and generates a signal which appears at terminal 12. These two signals are fed to a control circuit 13 which controls a direct current applied to the energizing coil of the electromagnet 6. If the ball tends to fall, then more light will pass round and over the top half of the ball and less light round and under the bottom half of the ball. This will cause variation of the signals fed from terminals 11 and 12 to the control circuit 13. Control circuit 13 will then increase the current fed to the electro-magnet 6 so as to raise the ball again to its original position. Should the ball tend to rise, then the reverse of the above will occur and the ball will thus be maintained at substantially the corect position relative to the coils 1 and 2.

In the apparatus so far described if the angle θ (between the axis χ—χ and the horizontal) is zero, then the ball 5 will rotate about an axis parallel to the axis of intersection of the coils 1 and 2, this axis being normal to the plane of the paper in FIGURE 1. The speed of rotation will depend mainly upon the frequency and magnitude of the currents fed to the coils and the direction will depend upon the sense of the phase displacement of the two ccurents (i.e. advanced or lagging). Thus the ball rotates about a single axis and any scanning device looking at the surface of the ball would only scan the entire surface of the ball under these condi- which was on a plane normal to the rotational axis. To scan the entire surface of the bal under these conditions the scanning head would have to be moved and this movement may be difficult to achieve with suitable reliability and precision.

It is therefore preferable to cause the axis of rotation of the ball to precess. By causing the precession to take one particularly form the result would be that a stationary scanning device directed at the ball would scan the surface of the ball in a spiral, starting for example at a "pole" position, passing spirally to an equatorial position approximately midway between the two "poles" of the ball and then back to the other "pole." The scanning device is directed at a position on the surface of the ball intersected by the rotational axis when the ball is in the position attained immediately before or after a precession cycle, that is a "pole" position.

One way to obtain such a precession is to mount the coils with the axis χ—χ at an angle to the horizontal as illustrated in FIGURE 1. The axis of rotation of the ball ω—ω will then take up an angular position φ relative to the horizontal; the angle φ depending upon the relative strengths of the rotating field produced by coils 1 and 2 and the supporting field of the magnet 6.

An optical scanning device 14 is mounted with its forward end within the coils and positioned so that it will scan the surface of the ball as it rotates. Light from a convenient light source, which may be the light source 7, is scattered from the surface of the ball and the intensity of this scattered light generates a signal in the scanning deivice, which may be a photo electric cell. Any variation in the surface conditions of the ball will cause a variation in intensity of the scattered light falling on the scanning device and will thus cause a variation in the signal generated. This signal is fed to a circuit 15 which may be used to provide an indication or, for example, to actuate a selector device for causing a rejection of any ball for which the scanning signal varies beyond predetermined limits.

Figure 2:
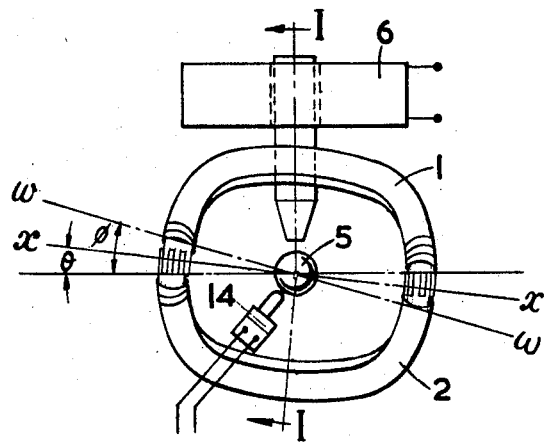
FIGURE 2 is another diagrammatic drawing of the same embodiment in the form of a side elevation in the direction of the arrow "A" in FIGURE 1.

In order to allow sufficient room for the insertion of the ball, and the supporting electromagnet 6, and for the passage of the light beam between the optical systems 8 and 9, the turns of the coils 1 and 2 are made of rectangular cross-section wire which is wound on edge at positions displaced from the inter-sections of the two coils, the wire being twisted through 90° so that the turns lie flat at the region where the coils intersect. This construction also enables undue thickness at the intersection to be avoided and permits successive layers of the two coils to be interleaved at the intersection points. This construction can most easily be seen in FIGURE 2 which is a side elevation of the apparatus with the optical system 8 and light source 7 omitted for clarity. In operation the rotating field is varied in strength by simultaneously reducing the amplitudes of the currents fed to the coils 1 and 2 from a maximum to a minimum, which is normally zero, by a control 16. When the amplitude of the currents fed to the coils 1 and 2 is at zero the control 16 transposes the connections to one of the coils and then increases the amplitudes of the currents fed to the coils 1 and 2 so that the axis of rotation ω—ω of the ball continues precessing, the axis ω—ω finally precessing through 180°. During this precession the scanning device will have scanned the entire surface of the ball in a spiral as described above.

The rate at which the precession of the rotational axis, as described above, can be carried out is limited at least for part of the cycle. The precession from a commencing nearly horizontal position to a midway approximately vertical position depends on the interaction of the supporting magnet field and the rotating field. The maximum strength of the supporting field, and therefore its maximum effect, is limited to that required to support the ball, and the maximum rate of precession is thus also limited. In addition the rotating field is approaching its minimum strength, which is normally zero, when the rotational axis is approaching a vertical position. There is therefore little or no rotating effect on the ball, which will slow down, causing distortion of the spiral scanning path. The time taken for a complete cycle can be considerably reduced if the precessional rate is positively controlled throughout the cycle.

Figure 3:
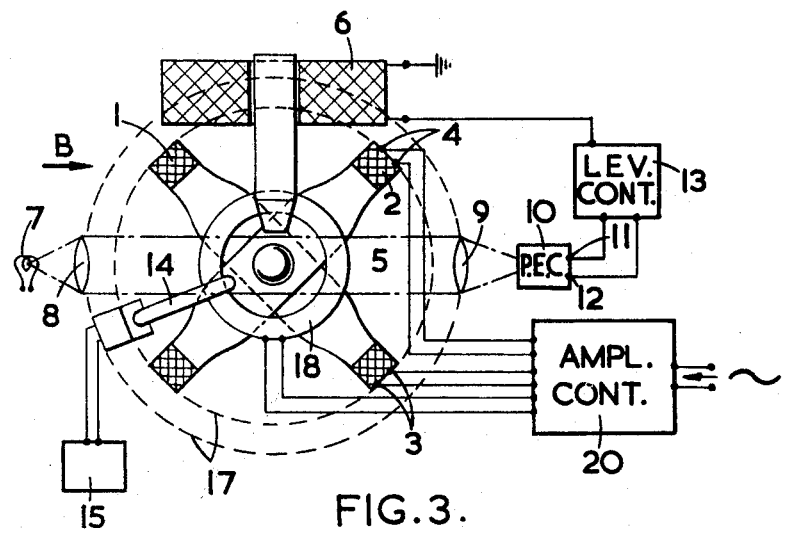
FIGURE 3 is a diagrammatic drawing of another embodiment in the form of a cross section in the line III—III of FIGURE 4.
Figure 4:
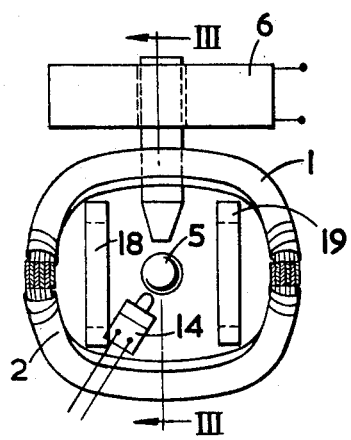
FIGURE 4 is another diagrammatic drawing of the second embodiment in the form of a side elevation in the direction of the arrow "B" in FIGURE 3.

Such controlled precession can be obtained by the addition of a third coil fed with alternating current, the plane of the coil being perpendicular to the axis of intersection of the first and second coils, the characteristics of the currents fed to the three coils being suitably controlled as illustrated in FIGURES 3 and 4. Most of the items in FIGURES 3 and 4 are similar to those in FIGURES 1 and 2 and are indicated by the same reference numbers. The coils 1 and 2 intersect each other at right angles, the axis of intersection being substantially horizontal. In this embodiment the precession can be arranged so that the axis of rotation of the ball rotates in any plane, depending upon the characteristics of the currents fed to the three coils. For convenience, however, the form of precession described below will be that obtained when the axis of rotation of the ball is rotated in a plane at 45° to the axis of the supporting magnetic field. The theoretical position of such a third coil is shown in FIGURE 3 by the dotted lines 17. However this position for the third coil would make it difficult to insert the supporting magnet 6 and the optical systems 8 and 9. It is preferred, therefore, to divide the third coil into two coils 18 and 19 which are located either side of the ball and within the coils 1 and 2. The plane of each of the coils 18 and 19 is normal to the axis of intersection of the coils 1 and 2 and the common axis of the coils 18 and 19 is coincidental with the axis of intersection.

It is more convenient, for ease of describing the operation of the apparatus, to consider the coil 1 as being vertical and coil 2 horizontal.

Figure 5:
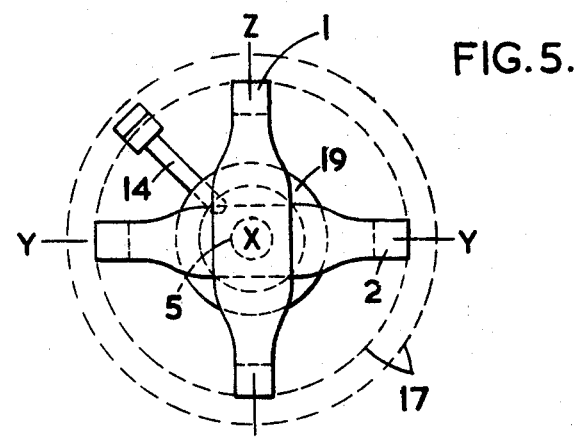
FIGURE 5 is a diagrammatic drawing of the second embodiment in the form of a further side elevation.
Figure 6:
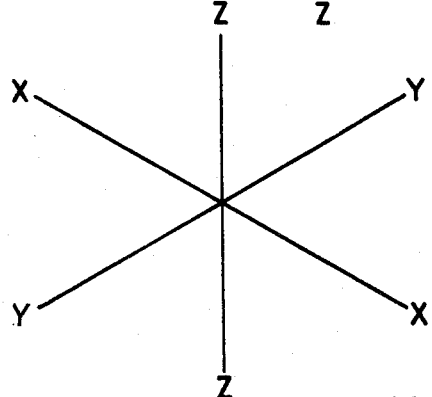
FIGURE 6 is a diagrammatic representation in perspective of the various axes in FIGURE 5.

This is illustrated diagrammatically in FIGURE 5, where items similar to those in FIGURES 3 and 4 carry the same reference numbers, the supporting magnet and optical systems being omitted. With the apparatus considered in this manner the axes can be illustrated in the conventional manner as in FIGURE 6. Axis X—X is the axis of intersection of the coils 1 and 2, axis Y—Y is the axis of intersection of coil 2 with the imaginary coil 17, and axis Z—Z is the axis of intersection of coil 1 with the imaginary coil 17. Axis Z—Z is vertical and axes X—X and Y—Y are each horizontal and are shown in perspective. The imaginary coil 17 is the equivalent of the two coils 18 and 19 as previously described. The application of alternating currents of the same frequency 90° out of phase to coils 1 and 2 will cause the ball to rotate about axis X—X, and applying corresponding currents to the coils 2 and 17 (equivalent to coils 18 and 19) will cause the ball to rotate about axis Y—Y. Applying corresponding currents to coil 1 and coil 17 (again equivalent to coils 18 and 19) will cause the ball to rotate about axis Z—Z. If it is required that the ball should initially rotate about the axis X—X, the axis of rotation then being precessed about axis Z—Z, this can be obtained as follows. Two alternating currents of the same frequency and 90° out of phase with each other are applied to coils 1 and 2. This causes initial rotation of the ball about axis X—X. An alternating current, of a frequency the same as the currents in coils 1 and 2, is then applied to coil 17, the current being in phase with the current in coil 1 and 90° out of phase with the current in coil 2. This will have the effect of adding to the ball a component of rotation about axis Y—Y. The total effect of the currents thus applied to the three sets of coils is to create a rotating magnetic field about an intermediate axis with components of rotation about axes X—X and Y—Y, the ball being rotated about this intermediate axis, with the aforesaid components of rotation about axes X—X and Y—Y. The position of the intermediate axis relative to the axes X—X and Y—Y will depend upon the relative strengths of the magnetic field produced by the currents in coils 1 and 17. To obtain constant precession and spin rates the vectorial sum of the values of the magnetic fields produced by the currents in the coils 1 and 17 should remain constant. As the value of the magnetic field strength produced by coil 1 approaches its maximum and the value of the magnetic field strength produced by coil 17 approaches zero, the intermediate axis mentioned above will approach the axis X—X, and converse variation of the values of the field strengths will cause the intermediate axis to approach the axis Y—Y. This variation of the magnetic field strengths in the apparatus as illustrated in FIGURE 3 is obtained by a control circuit 20 which varies the current amplitudes in an appropriate manner. Suitable variation of the amplitudes of the currents in coils 1 and 17 will cause the axis of rotation of the ball to precess about the axis Z—Z. The scanning device is so positioned that it receives light scattered from the surface of the ball at a position on the surface where it is intersected by the axis X—X. When the axis of rotation of the ball is on the axis X—X, the scanning device will scan a "pole" position on the ball. The amplitudes of the currents in coils 1 and 17 are then varied so as to cause the axis of rotation of the ball to precess about the axis Z—Z for a quarter of a complete revolution. The control current then effectively transposes the electrical connections to coil 1 (or 17) and variation of the current amplitudes back to their original values will then cause the axis of rotation of the ball to precess about the axis Z—Z for a further quarter of a revolution. The scanning device will thus scan the surface of the ball in a spiral path, starting at a "pole" position, passing spirally to an equatorial position, and then back to the other pole. In order that the entire surface of the ball is scanned the adjacent turns of the spiral path round the surface of the ball are arranged to overlap slightly. This can be arranged by controlling the width of the individual path scanned and the relative speeds of rotation and precession. After the ball has been inspected it is then removed from the apparatus by any suitable means and another ball inserted. The control circuit 20 can then either vary the amplitudes of the currents to the coils so that the ball precesses back to the original position of the first ball, the surface being inspected during this precession, or the precession can continue in the same direction as previously.

Figure 7:
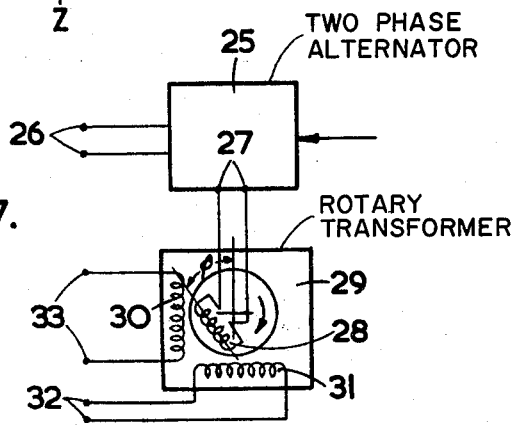
FIGURE 7 is a diagrammatic representation of one form of a control circuit as used in the embodiment illustrated in FIGS. 3 and 4.

One form of an electrical circuit suitable for use as the control circuit 20 is illustrated in FIGURE 7. This shows the use of a rotary transformer for obtaining the various current amplitudes for the various coils. A two phase alternator 25 provides two outputs, one output being fed via terminals 26 direct to coil 2 in the embodiment illustrated in FIGURES 3 and 4 and described above. The other output is fed via terminals 27 to rotatable primary winding 28 of a rotary transformer 29. The outputs from two angularly displaced secondary windings 30 and 31 of the rotary transformer are fed to terminals 32 and 33. The outputs from the alternator 25 are in quadrature, one being of the form $A \sin \omega t$ and the other $A \cos \omega t$. If, for example, the output $A \sin \omega t$ is fed direct to the coil 2, then the other output, $A \cos \omega t$, is fed to the winding 28 of the transformer 29. The outputs from the transformer will be in the form of $A_1 \cos \omega t \sin \phi$ at terminals 32 and $A_1 \cos \omega t \cos \phi$ at terminals 33, the value of $\phi$ varying as the angular position of the winding 28 varies. It will be seen that as the rotation of the winding 28 continues beyond 90° there will be a change in the sign of one of the terms, $\sin \phi$ and $\cos \phi$. If this change of sign did not take place, the precession programme of the ball would not continue in the same direction on the completion of a quarter of a revolution so as to complete the half revolution, but would retraverse the first quarter of a revolution in reverse. Thus while the winding 28 is continuously rotated, the rotational axis of the ball will precess at substantially the same speed. Where this speed of precession is to be maintained substantially constant then the primary winding 28 would be rotated at a constant speed.

In the embodiment as described above where the axis of rotation is precessed in a plane at 45° to the axis of the supporting magnet field the axis of rotation may deviate for some portion of the cycle from this plane due to the particular magnetic properties of the material used for the manufacture of the ball. This deviation can be avoided by causing the precession to be in a plane normal to the supporting magnet field. This form of precession can be obtained either by varying the fields of coils 1 and 17 in a manner differing from that described above, or by making one of the coils 1 or 2 vertical and the other horizontal. In the latter case, it will be necessary to make provision for the insertion of the supporting magnet through the top of the vertical coil, the pole piece being suitably shielded from the effect of the A.C. current flowing in the vertical coil.

I claim:

1. Apparatus for the rotation and testing of objects of generally spherical form comprising support means for magnetically supporting the object, control means responsive to the vertical position of the object and acting to control the said magnetic support means so as to maintain the object in a predetermined position, two coils intersecting each other at right angles and disposed so that the object is supported magnetically at the centre of the coils, the axis of intersection of the two coils being inclined slightly relatively to a plane normal to the axis of the support means, means for feeding an alternating current to the two coils such that they are in quadrature to produce a rotating magnetic field whereby the object will rotate in a predetermined manner and means for scanning the object during its rotation so that any imperfections may be noted.

2. Apparatus according to claim 1 wherein the strength of the rotating field is varied from a maximum to a minimum and back again to a maximum by a control member and wherein the electrical connections to one of the coils are transposed by the control member during the rotation to obtain precession of the rotational axis of the object.

3. Apparatus according to claim 1 comprising two ring shaped coils intersecting at right angles, means for feeding an alternating current to each coil via suitable terminals, the current fed to one coil being 90° out of phase with respect to the current fed to the other coil but of the same frequency, and a vertical electromagnet to hold the object at the centre of the coils.

4. Apparatus according to claim 1 including an electromagnet, a light source to project a beam of light on to the object, a photo-electric cell behind the object, two cathodes within the cell, one responsive to light passing round and over the object and the other responsive to light passing round and under the object and a control circuit responsive to signals received from the cathodes to regulate the current applied to the energising coil of the electromagnet.

5. Apparatus according to claim 1 wherein the speed of rotation of the object is controlled by the frequency and magnitude of the currents fed to the coils and the direction depends upon the sense of the phase displacement.

6. Apparatus according to claim 1 characterised by the provision of an optical scanning device mounted with its forward end within the coils and positioned so that it will scan the surface of the object as it rotates, a light source being provided and directed so that light scattered from the object falls upon the scanning device which is adapted to generate a signal proportional to the intensity of the scattered light.

7. Apparatus according to claim 6 comprising a circuit to receive the signal from the scanning device operative in dependency on the amplitude of the scanning signal.

8. Apparatus according to claim 1 wherein the turns of the coils are made of rectangular cross-section wire which is wound on edge at positions displaced from the intersections of the two coils, the wire being twisted through 90° so that the turns lie flat at the region where the coils intersect.

9. Apparatus according to claim 1 characterised by the provision of a third coil adapted to be fed by alternating current, the plane of the coil being perpendicular to the axis of intersection of the first and second coils.

10. Apparatus according to claim 1 including a third coil divided into two parts which are located at each side of the object and within the first and second coil, the plane of each part of the third coil being normal to the axis of intersection of the first two coils and the common axis of the two parts being coincidental with the axis of intersection.

11. Apparatus according to claim 2 wherein the control member comprises a rotatable drive coil magnetically coupled to two field responsive inductors transversely positioned to one another.

12. Apparatus for the rotation of objects of generally spherical form comprising support means for magnetically supporting the object, control means responsive to the vertical position of the object, and acting to control said magnetic support means so as to maintain the object in a predetermined position, means for rotating the object about a first axis comprising two coils formed of electrical conductors disposed about the object and intersecting each other at right angles, the conductors of both coils being interleaved together at the intersection of the coils, and alternating current supply means for separately energizing the two coils.

13. Apparatus for the rotation of objects of generally spherical form comprising support means for magnetically supporting the object, control means responsive to the vertical position of the object, and acting to control said magnetic support means so as to maintain an object in a predetermined position, two coils disposed about the object intersecting each other at right angles, alternating current supply means for separately energizing the two coils to rotate a supported object about a first axis, and a third coil adapted to be fed by alternating current positioned in a plane perpendicular to the axis of intersection of said two coils for rotating the supported object about a second axis.

14. Apparatus for the rotation of objects of generally spherical form comprising support means for magnetically supporting the object, control means responsive to the vertical position of the object, and acting to control said magnetic support means so as to maintain an object in a predetermined position, two coils disposed about the object intersecting each other at right angles, alternating current supply means for separately energizing the two coils to rotate a supported object about a first axis, and two spaced parallel coils adapted to be fed by alternating current, the planes of the parallel coils being perpendicular to the axis of intersection of the two intersecting coils, for rotating the supported object about a second axis.

References Cited in the file of this patent

UNITED STATES PATENTS

| 2,566,221 | Lovell | Aug. 28, 1951 |
| 2,733,857 | Beams | Feb. 7, 1956 |
| 2,845,177 | Perkins et al. | July 29, 1958 |

FOREIGN PATENTS

| 539,409 | Great Britain | Sept. 9, 1941 |

OTHER REFERENCES

Magnetic-Suspension Ultracentrifuge Circuits (J. W. Beams, University of Virginia), published in Electronics, March 1954.